United States Patent
Matsunaga

(10) Patent No.: US 11,511,707 B2
(45) Date of Patent: Nov. 29, 2022

(54) VEHICLE CLEANER SYSTEM

(71) Applicant: KOITO MANUFACTURING CO., LTD., Tokyo (JP)

(72) Inventor: Takahiro Matsunaga, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 194 days.

(21) Appl. No.: 16/559,119

(22) Filed: Sep. 3, 2019

(65) Prior Publication Data

US 2020/0070784 A1 Mar. 5, 2020

(30) Foreign Application Priority Data

Sep. 4, 2018 (JP) .............................. JP2018-165142

(51) Int. Cl.
| | | |
|---|---|---|
| *B60S 1/56* | (2006.01) | |
| *B60S 1/52* | (2006.01) | |
| *B60R 11/04* | (2006.01) | |

(52) U.S. Cl.
CPC . *B60S 1/56* (2013.01); *B60S 1/52* (2013.01); *B60R 11/04* (2013.01)

(58) Field of Classification Search
None
See application file for complete search history.

(56) References Cited

U.S. PATENT DOCUMENTS

| | | | | |
|---|---|---|---|---|
| 6,626,377 B1 * | 9/2003 | Vogt | ........................... | B60S 1/52 239/587.5 |
| 10,946,402 B2 * | 3/2021 | Santagiuliana | ..... | B05B 11/3021 |
| 2004/0195366 A1 * | 10/2004 | Salvador | ................. | B60S 1/526 239/284.1 |
| 2005/0121539 A1 * | 6/2005 | Takada | ...................... | B60S 1/52 239/284.2 |
| 2006/0243823 A1 * | 11/2006 | Bachmann | ................ | B60S 1/52 239/513 |
| 2007/0132610 A1 | 6/2007 | Guernalec et al. | | |
| 2008/0169358 A1 * | 7/2008 | Hofmann | .................. | B60S 1/52 239/284.1 |
| 2009/0250533 A1 | 10/2009 | Akiyama et al. | | |
| 2010/0224707 A1 * | 9/2010 | Rathey | ...................... | B60S 1/52 239/589 |
| 2013/0320108 A1 * | 12/2013 | Sesser | ..................... | B05B 1/262 239/74 |
| 2016/0354792 A1 * | 12/2016 | Su | .......................... | A01G 25/16 |
| 2018/0126921 A1 * | 5/2018 | Koseki | ..................... | B60S 1/56 |

(Continued)

FOREIGN PATENT DOCUMENTS

| | | |
|---|---|---|
| JP | 2007-512165 A | 5/2007 |
| JP | 2009-248661 A | 10/2009 |

*Primary Examiner* — Spencer E. Bell
*Assistant Examiner* — Omair Chaudhri
(74) *Attorney, Agent, or Firm* — Osha Bergman Watanabe & Burton LLP

(57) ABSTRACT

A vehicle cleaner system for cleaning an object to be cleaned, the vehicle cleaner system has a nozzle configured to inject a cleaning medium to the object to clean the object, and a nozzle holder having a holding portion for holding the nozzle and attached to a vehicle or the object. The nozzle has a held portion held by the holding portion. The nozzle is rotatably held with respect to the nozzle holder by press-fitting the held portion into the holding portion. A rotational direction of the nozzle with respect to the nozzle holder is restricted to a predetermined first direction.

6 Claims, 10 Drawing Sheets

(56) References Cited

U.S. PATENT DOCUMENTS

2018/0231042 A1\* 8/2018 Turowski ............ F16B 12/2063
2019/0092286 A1\* 3/2019 Henn ...................... B08B 3/024
2020/0171524 A1\* 6/2020 Santagiuliana ..... B05B 11/0094
2020/0231127 A1\* 7/2020 Seiller .................... B60S 1/522

\* cited by examiner

VEHICLE CLEANER SYSTEM

CROSS-REFERENCE TO RELATED APPLICATIONS

This application is based on and claims priority under 35 USC 119 from Japanese Patent Application No. 2018-165142 filed on Sep. 4, 2018, the contents of which are incorporated herein by reference.

TECHNICAL FIELD

The disclosure relates to a vehicle cleaner system for cleaning an object to be cleaned.

BACKGROUND ART

JP-T-2007-512165 (PTL 1) discloses a spray device which is configured integrally with a housing of a rear view camera of a vehicle and which is adapted to inject a cleaning liquid for cleaning a transparent plate of the housing.

Further, JP-A-2009-248661 (PTL 2) discloses a camera with a washer nozzle, which includes a camera having a lens and a washer nozzle having a window injection port for injecting a washer liquid to a window of a vehicle. The washer nozzle is provided with a camera pipeline for leading a washer liquid to a camera injection port through which the washer liquid is injected to a camera lens, in addition to a window pipeline for leading the washer liquid to the window injection port.

SUMMARY OF INVENTION

By the way, when the spray device disclosed in PTL 1 or the washer nozzle disclosed in PTL 2 is attached to vehicles of different types, it may be necessary to change the shapes of the parts constituting these devices accordingly since the mounting conditions differ depending on the vehicle type. Further, when mounting a nozzle of a cleaner for injecting a cleaning liquid to an object to be cleaned on a vehicle, the variation in assembly may occur. Also in this case, it is required to properly maintain the injection direction of the cleaning medium from the cleaner to the object to be cleaned.

Aspect of non-limiting embodiments of the present disclosure relates to provide a vehicle cleaner system capable of properly and easily adjusting the injection direction of the cleaning medium with respect to the object to be cleaned.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a vehicle cleaner system for cleaning an object to be cleaned, the vehicle cleaner system comprising:

a nozzle configured to inject a cleaning medium to the object to clean the object; and a nozzle holder having a holding portion for holding the nozzle and attached to a vehicle or the object, wherein the nozzle has a held portion held by the holding portion, the nozzle is rotatably held with respect to the nozzle holder by press-fitting the held portion into the holding portion, and a rotational direction of the nozzle with respect to the nozzle holder is restricted to a predetermined first direction.

BRIEF DESCRIPTION OF DRAWINGS

Exemplary embodiment(s) of the present invention will be described in detail based on the following figures, wherein.

DESCRIPTION OF EMBODIMENTS

Figure 1:
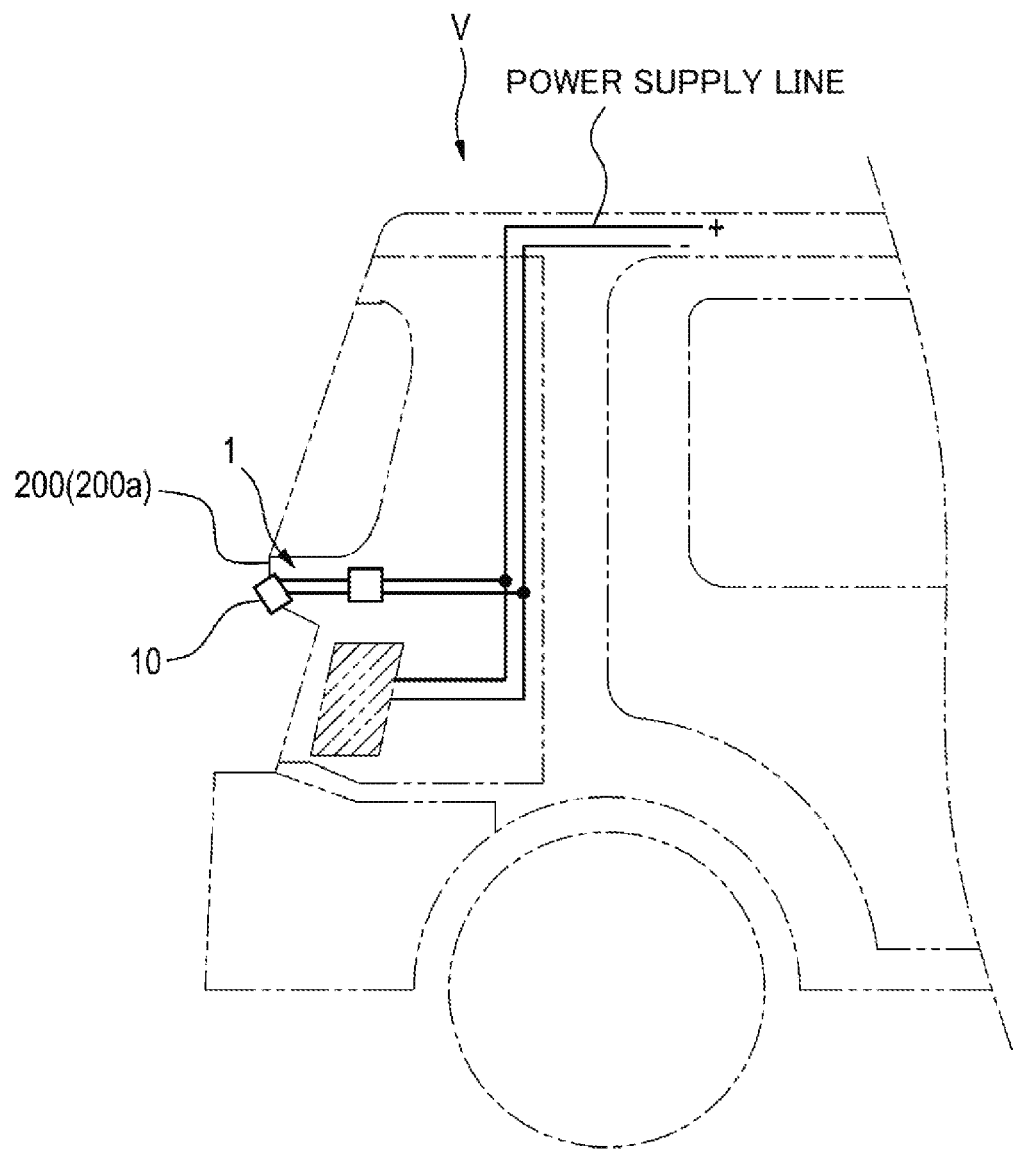
FIG. 1 is a side view of a rear part of a vehicle provided with a vehicle cleaner system according to an exemplary embodiment of the disclosure.

Description of the Exemplary Embodiment of the Present Disclosure

First, exemplary embodiments of the present disclosure will be listed and described.

According to an aspect of the present disclosure, there is provided a vehicle cleaner system for cleaning an object to be cleaned, the vehicle cleaner system comprising:

a nozzle configured to inject a cleaning medium to the object to be cleaned to clean the object to be cleaned; and a nozzle holder having a holding portion for holding the nozzle and attached to a vehicle or the object to be cleaned, wherein the nozzle has a held portion held by the holding portion, the nozzle is rotatably held with respect to the nozzle holder by press-fitting the held portion into the holding portion, and a rotational direction of the nozzle with respect to the nozzle holder is restricted to a predetermined first direction.

According to the above configuration, the nozzle can be rotated with respect to the nozzle holder by press-fitting the held portion into the holding portion, so that the injection direction of the cleaning medium injected from the nozzle can be adjusted. Further, the injection direction of the cleaning medium can be properly and easily adjusted by restricting the rotational direction of the nozzle with respect to the nozzle holder to the first direction. Therefore, the vehicle cleaner system can be applied to a plurality of types of vehicles having different mounting constraints. Further, even when there is a variation in the assembly of the nozzle to the vehicle or the object to be cleaned, the variation can be absorbed by rotating the nozzle to adjust the injection direction of the cleaning medium to an appropriate direction. In this way, there is no need to adopt the nozzle shape according to the vehicle type, and it is possible to cope with the variation in assembly. As a result, the manufacturing cost of the vehicle cleaner system and the operation cost of the assembly can be suppressed.

The held portion may be formed as a sphere, and the holding portion may be formed in a cylindrical shape capable of accommodating the held portion therein.

According to the above configuration, the nozzle can be rotated with respect to the nozzle holder with a simple configuration in which the spherical held portion is press-fitted into the cylindrical holding portion.

The first direction may be a direction close to or away from the object to be cleaned.

According to the above configuration, the injection direction of the cleaning medium to the object to be cleaned can be easily adjusted.

The nozzle may be provided above the object to be cleaned, and the first direction may be set along an upper and lower direction of the object to be cleaned.

According to the above configuration, the injection direction of the cleaning medium to the object to be cleaned can be easily adjusted, as compared to the case where the nozzle is provided above the object to be cleaned.

The nozzle holder may further includes a pair of restricting portions for restricting the rotational direction of the nozzle, the pair of restricting portions may be arranged to sandwich the holding portion in a third direction orthogonal to a second direction along a press-fitting direction of the nozzle into the nozzle holder and the first direction, and a rotational axis of the nozzle may be restricted to be in the third direction when the nozzle is engaged with the pair of restricting portions.

According to the above configuration, the rotational direction of the nozzle can be restricted only to the first direction with a simple configuration.

A base may be provided at one end of the holding portion along the second direction, the pair of restricting portions may be formed in a flat plate shape protruding from the base along the second direction, and the nozzle may have a pair of engagement portions formed in a flat plate shape and arranged to sandwich the held portion in the third direction.

According to the above configuration, the rotational direction of the nozzle can be restricted only to the first direction with a simple configuration.

A protrusion may be formed in each of the pair of engagement portions, and a recess with which the protrusion is engaged may be formed in each of the pair of restricting portions.

A protrusion may be formed in each of the pair of restricting portions, and a recess with which the protrusion is engaged may be formed in each of the pair of engagement portions.

According to these configurations, it is possible to prevent the nozzle from being detached from the nozzle holder even when the cleaning liquid that is the cleaning medium accumulated in the nozzle holder or the nozzle is frozen an expanded.

The held portion may be formed in a cylindrical shape with a rotational axis of the nozzle for rotating in the first direction as a central axis, the holding portion may have a recess for accommodating the held portion, and the recess may be formed in such a shape that the nozzle can rotate along the first direction about the rotational axis when the cylindrical held portion is press-fitted into the holding portion.

According to the above configuration, the rotational direction of the nozzle with respect to the nozzle holder can be restricted with a simple configuration in which the cylindrical held portion is press-fitted into the holding portion having a predetermined shape (e.g., a semi-cylindrical shape).

According to an aspect of the present disclosure, there is provided a vehicle cleaner system for cleaning a sensor attached to a vehicle, the vehicle cleaner system comprising:

a nozzle configured to inject a cleaning medium to the sensor to clean the sensor; and a nozzle holder having a holding portion for holding the nozzle and attached to the vehicle or the sensor, wherein the nozzle has a held portion held by the holding portion, and the nozzle is rotatably held with respect to the nozzle holder by press-fitting the held portion into the holding portion.

According to the above configuration, the nozzle can be rotated with respect to the nozzle holder by press-fitting the held portion into the holding portion, so that the injection direction of the cleaning medium with respect to the sensor can be properly and easily adjusted.

Details of Exemplary Embodiments of the Present Disclosure

Hereinafter, based on embodiments, the disclosure will be described with reference to the drawings. The same or similar constituent elements, members or processes shown in each drawing are denoted by the same reference numerals, and the repeated explanations thereof are omitted as appropriate. Further, the embodiments are not intended to limit the disclosure but are merely examples. All the features described in the embodiments and combinations thereof are not necessarily essential to the disclosure.

A vehicle cleaner system of the disclosure is applied as a system for cleaning foreign matters such as water droplets, mud and dust adhering to a vehicle lamp mounted on a vehicle, an in-vehicle sensor, or a vehicle window or the like (an example of an object to be cleaned) using cleaning medium such as cleaning liquid or high-pressure air. Meanwhile, the in-vehicle sensor includes, for example, a camera, a LiDAR, a laser, and the like. The LiDAR is an abbreviation of Light Detection and Ranging or Laser Imaging Detection and Ranging.

FIG. 1 is a side view showing a rear part of a vehicle provided with a vehicle cleaner system. As shown in FIG. 1, a vehicle cleaner system 1 is attached, for example, to a back door 200 of a vehicle V. Specifically, the vehicle cleaner system 1 is attached, for example, to a vehicle (body) panel 200a of the back door 200. The vehicle panel 200a includes a body panel, a garnish, and the like. The vehicle cleaner system 1 (1A, 1B) includes a drive unit. A power supply terminal of the drive unit is connected to a power supply line of the vehicle V. Meanwhile, the vehicle cleaner system 1 may be attached, for example, to a rear bumper or the like of the vehicle V.

First Exemplary Embodiment

Figure 2:
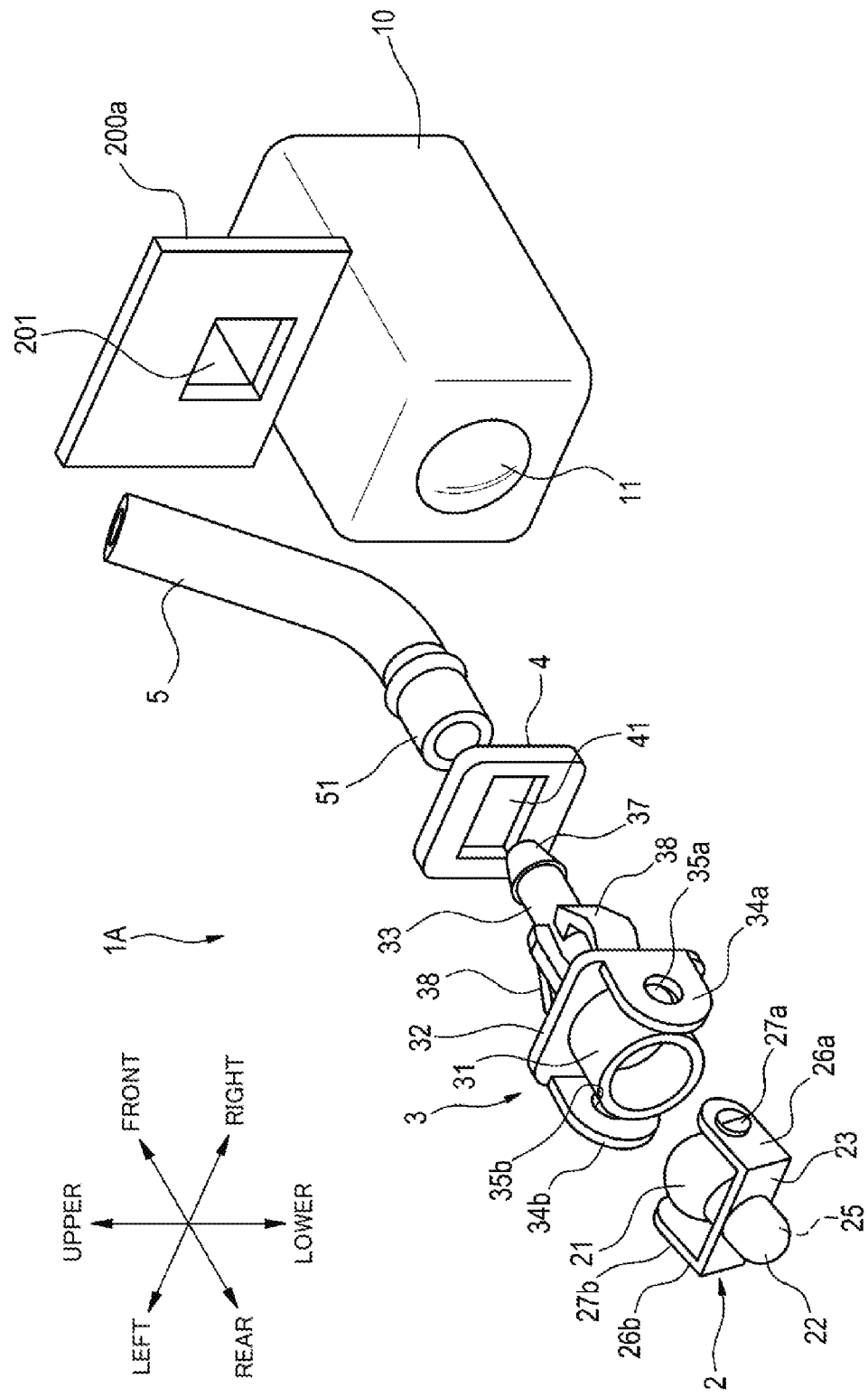
FIG. 2 is an exploded perspective view of a vehicle cleaner system according to a first exemplary embodiment of the disclosure.

FIG. 2 is an exploded perspective view of the vehicle cleaner system 1A according to the first exemplary embodiment. As shown in FIG. 2, the vehicle cleaner system 1A includes the nozzle 2 for injecting cleaning liquid toward a camera 10, and the nozzle holder 3 for holding the nozzle 2. In the present embodiment, the nozzle holder 3 is attached to the vehicle panel 200a of the back door 200. Meanwhile, the nozzle holder 3 may be attached, for example, to the camera 10 which is an object to be cleaned.

Further, the vehicle cleaner system 1A includes a packing 4 arranged between the nozzle holder 3 and the vehicle panel 200a to which the nozzle holder 3 is attached, and a hose 5 through which cleaning liquid to be supplied to the nozzle 2 flows. One end of the hose 5 is connected to the nozzle holder 3.

Further, the vehicle cleaner system 1A includes a pump (not shown) for pumping cleaning liquid and a control unit (not shown) for controlling the pump to inject the cleaning liquid from the nozzle 2. The end of the hose 5 opposite to the side to which the nozzle holder 3 is connected is connected to the pump. The pump is disposed, for example, in a bonnet of the vehicle V or at a predetermined position on the rear side of the vehicle V.

Figure 3:
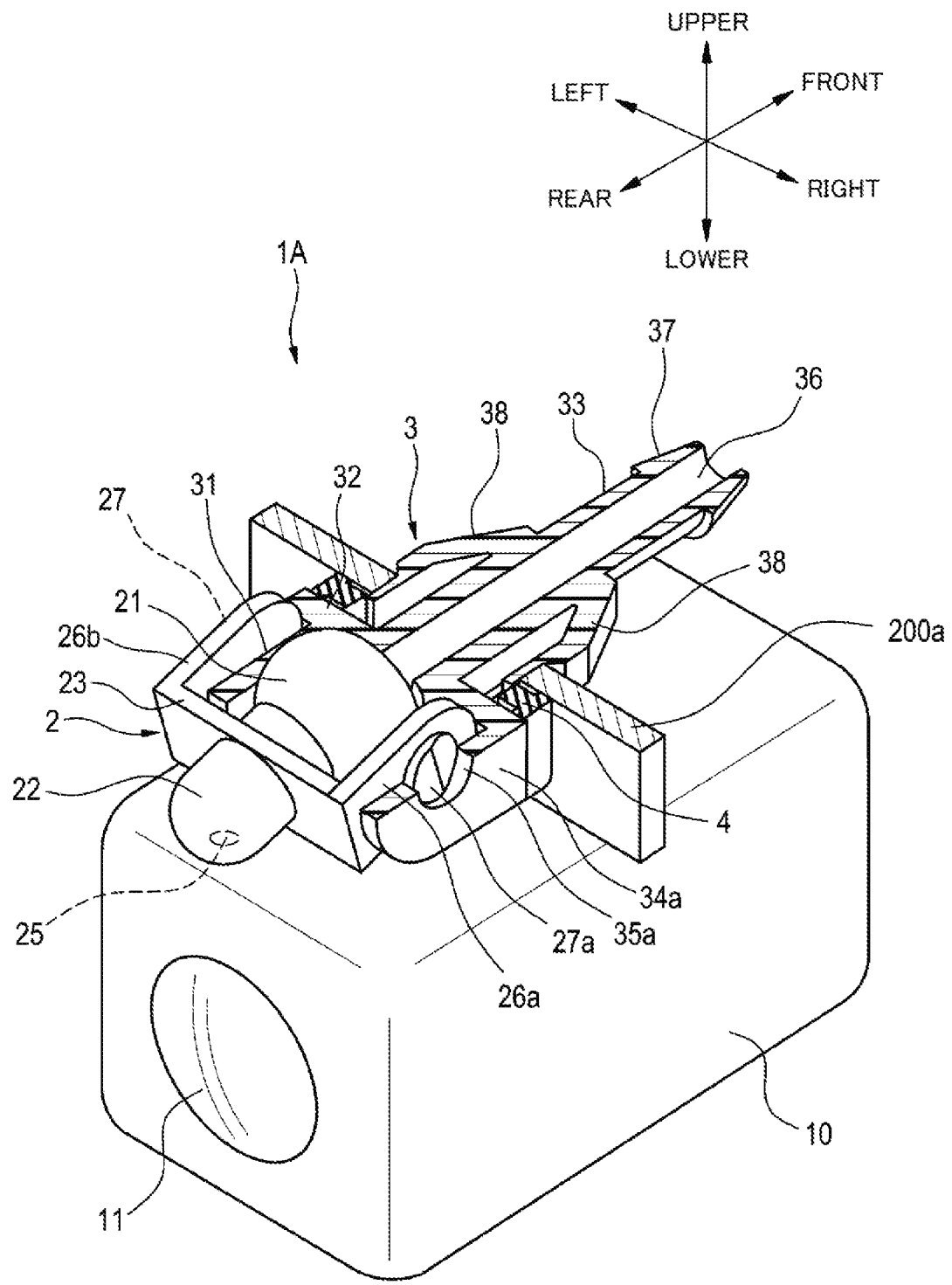
FIG. 3 is a sectional perspective view for explaining the configuration of a nozzle and a nozzle holder.
Figure 4:
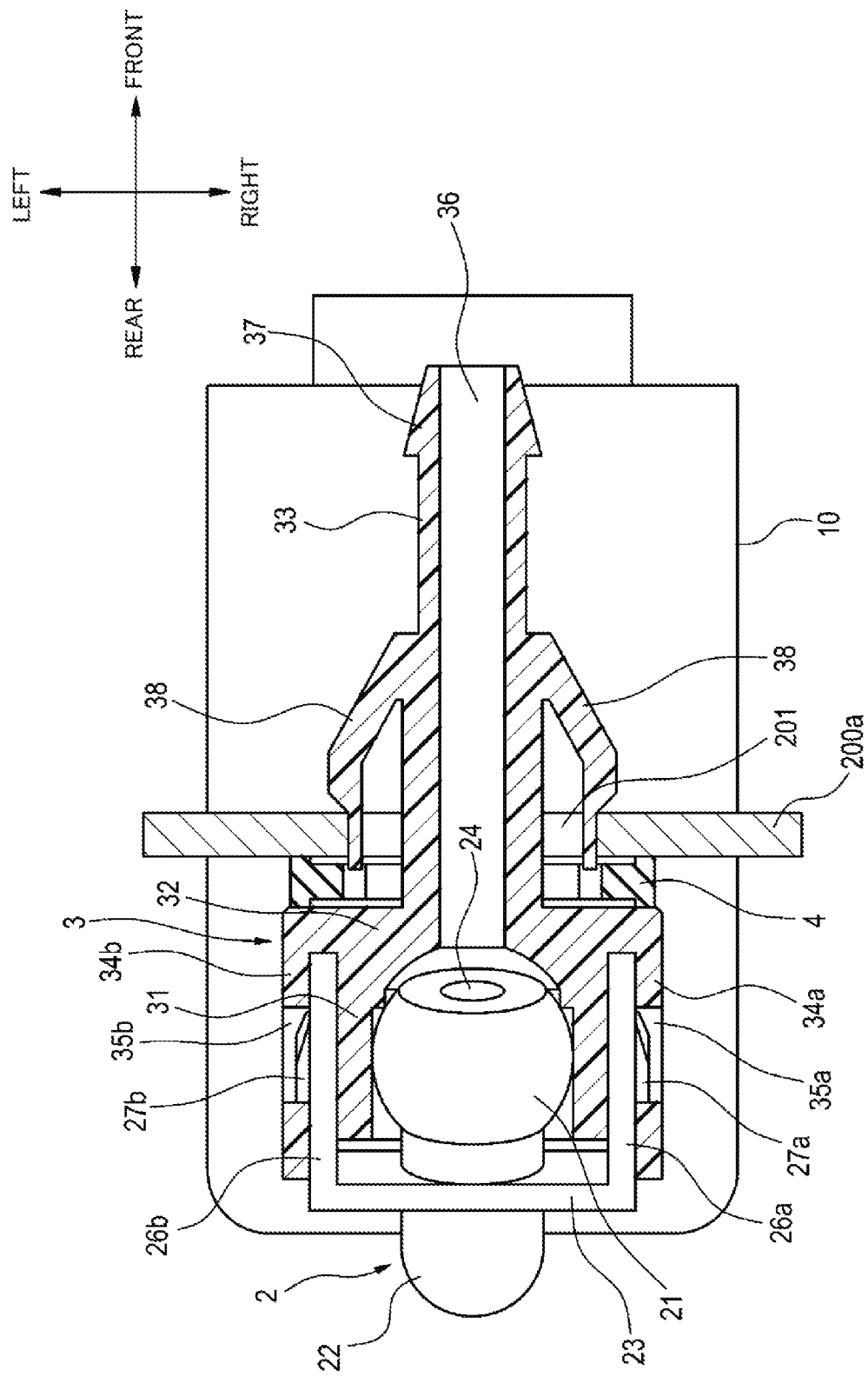
FIG. 4 is a plan view of FIG. 3.

FIG. 3 is a perspective view showing a state in which the nozzle 2 is assembled to the nozzle holder 3 and the nozzle holder 3 to which the nozzle 2 is assembled is attached to the vehicle panel 200a of the back door 200. In FIG. 3, the nozzle holder 3, the packing 4, and the vehicle panel 200a are shown in a sectional view in order to show the configuration of the nozzle 2 and the nozzle holder 3. Further. FIG. 4 is a plan view of FIG. 3 as viewed from above.

As shown in FIGS. 2 to 4, in the present exemplary embodiment, the nozzle holder 3 is attached to the vehicle panel 200a provided on the top of the camera 10. Therefore, the nozzle 2 assembled to the nozzle holder 3 is disposed on the top of the camera 10. Meanwhile, the position where the nozzle 2 is disposed is not limited to the top of the camera 10. For example, the position where the nozzle 2 is disposed may be either the left or right side or the lower portion of the camera 10. In this case, the position of the vehicle panel 200a to which the nozzle holder 3 is attached is also a predetermined position corresponding thereto.

The nozzle 2 has a held portion 21 held by the nozzle holder 3, a discharge port portion 22 through which the cleaning liquid is discharged, and a base 23 provided between the held portion 21 and the discharge port portion 22. The nozzle 2 is made of a resin member.

The held portion 21 is formed as a sphere. The held portion 21 is provided on the front side of the nozzle 2, and a communication passage 24 for the cleaning liquid is provided therein so as to penetrate in a front and rear direction. The communication passage 24 is connected to the discharge port portion 22.

The discharge port portion 22 is provided at the rear portion of the nozzle 2, and a communication passage (not shown) for the cleaning liquid is provided therein so as to be connected to the communication passage 24 of the held portion 21. A discharge port 25 opened toward a lens 11 of the camera 10 is provided at the lower portion of the discharge port portion 22. The discharge port 25 is connected to the communication passage.

The base 23 is formed in a flat plate shape. The base 23 is provided to extend in a left and right direction between the held portion 21 and the discharge port portion 22. The base 23 has a pair of engagement portions 26a. 26b formed in a flat plate shape and protruding from the base 23 toward the front (the direction of the nozzle holder 3). The pair of engagement portions 26a, 26b are arranged to sandwich the held portion 21 in a left and right direction (third direction) of the held portion 21.

Protrusions 27a, 27b are provided on the pair of engagement portions 26a, 26b, respectively. The protrusion 27a provided on the right engagement portion 26a protrudes in the right direction from the right surface of the engagement portion 26a. The protrusion 27b provided on the left engagement portion 26b protrudes in the left direction from the left surface of the engagement portion 26b. The protrusions 27a, 27b in the present embodiment are formed in a circular shape. Each of the circular protrusions 27a, 27b is formed in an inclined shape in which a portion on the front side becomes low (narrow) toward the front.

The nozzle holder 3 has a holding portion 31 for holding the held portion 21 of the nozzle 2, a base 32 provided at one end of the holding portion 31, and a connection portion 33 connected to the hose 5. The nozzle holder 3 is made of a resin member.

The holding portion 31 is formed in a cylindrical shape. The holding portion 31 is disposed at the front side of the nozzle holder 3 and provided to extend in a front and rear direction (second direction). The holding portion 31 is configured so that the held portion 21 of the nozzle 2 formed in a sphere can be accommodated in the holding portion 31. The inner diameter of the cylindrical holding portion 31 is formed to be equal to or slightly smaller than the outer diameter of the held portion 21 which is a sphere. The nozzle 2 is assembled to the nozzle holder 3 by press-fitting the held portion 21 as a sphere into the cylindrical holding portion 31.

The base 32 is formed in a flat plate shape. The base 32 is provided to extend in the left and right direction at the rear end of the holding portion 31. The base 32 has a pair of restricting portions 34a, 34b formed in a flat plate shape and protruding from the base 32 toward the rear (the direction of the nozzle 2). The pair of restricting portions 34a, 34b restricts the rotational direction of the nozzle 2 with respect to the nozzle holder 3 to a predetermined direction. The pair of restricting portions 34a, 34b are arranged to sandwich the holding portion 31 in the left and right direction (third direction) of the holding portion 31. The distance between the inner surfaces of the pair of restricting portions 34a, 34b is configured to be substantially the same as the distance between the outer surfaces of the pair of engagement portions 26a, 26b of the nozzle 2.

Openings 35a, 35b are provided on the pair of restricting portions 34a, 34b, respectively. The openings 35a, 35b in the present embodiment are formed in a circular shape. Meanwhile, the openings 35a, 35b provided on the restricting portions 34a, 34b may be formed as circular recesses. In this case, the recesses are formed on the inner surface sides of the restricting portions 34a, 34b.

The connection portion 33 is provided at the rear portion of the nozzle holder 3, and a communication passage 36 for the cleaning liquid is provided therein so as to penetrate in the front and rear direction. A rear end of the communication passage 36 is connected to an internal space of the holding portion 31. A connection hole 37 provided at a front end of the connection portion 33 is connected to the hose 5. Mounting arm portions 38 for mounting the nozzle holder 3 to the vehicle panel 200a are provided at both left and right sides of the connection portion 33. The connection portion 33 of the nozzle holder 3 is inserted into an opening 201 formed in the vehicle panel 200a and the mounting arm portions 38 are engaged with the opening 201, so that the vehicle panel 200a is sandwiched by the mounting arm portions 38 and the base 32 from the front and rear.

The packing 4 is formed of, for example, a buffer member such as a rubber. The packing 4 improves the degree of adhesion of the nozzle holder 3 to the vehicle panel 200a and buffers the mounting pressure applied from the nozzle holder 3 to the vehicle panel 200a. The packing 4 in the present embodiment is formed in a rectangular shape. The packing 4 is disposed between the base 32 of the nozzle holder 3 and a rear surface of the vehicle panel 200a by inserting the connection portion 33 of the nozzle holder 3 into an opening 41 formed at the central portion of the packing 4.

One end 51 of the hose 5 is connected to the connection hole 37 of the nozzle holder 3. The hose 5 is disposed inside the vehicle panel 200a.

In a state where the nozzle holder 3 of the vehicle cleaner system 1A is attached to the vehicle panel 200a, the holding portion 31, the base 32 and the restricting portions 34a, 34b of the nozzle holder 3, and the nozzle 2 assembled to the nozzle holder 3 are disposed outside the vehicle panel 200a.

When the held portion 21 of the nozzle 2 is press-fitted into the holding portion 31 of the nozzle holder 3, the held portion 21 of the nozzle 2 is rotatably held in the holding portion 31 of the nozzle holder 3.

Further, when the held portion 21 of the nozzle 2 is press-fitted into the holding portion 31 of the nozzle holder 3, the pair of engagement portions 26a, 26b of the nozzle 2 is incorporated so as to overlap with the inside of the pair of restricting portions 34a, 34b of the nozzle holder 3. As the engagement portions 26a, 26b are incorporated so as to overlap with the inside of the restricting portions 34a, 34b, the protrusions 27a. 27b of the engagement portions 26a, 26b are engaged with the openings 35a, 35b of the restricting portions 34a. 34b.

When the protrusions 27a, 27b of the nozzle 2 are engaged with the openings 35a. 35b of the nozzle holder 3, the rotatable direction of the held portion 21 held in the holding portion 31 is restricted to the rotational direction with the left and right direction (third direction) passing through the protrusions 27a, 27b as a rotational axis. As the rotational direction of the held portion 21 is restricted to the rotational direction about the rotational axis passing through the protrusions 27a, 27b, a rotational movement direction (first direction) of the discharge port portion 22 of the nozzle 2 is restricted to the direction corresponding to the upper and lower direction of the camera 10. In this way, the rotational direction of the nozzle 2 with respect to the nozzle holder 3 is a direction including at least the direction in which the nozzle 2 moves close to or away from the lens 11 of the camera 10. Therefore, the nozzle 2 is movable at least in the direction in which it moves close to or away from the lens 11 of the camera 10.

Meanwhile, for example, when the nozzle 2 is disposed on the side of the camera 10, the rotational direction of the nozzle 2 with respect to the nozzle holder 3 is restricted to the direction along the left and right direction of the camera 10.

Figure 5A:
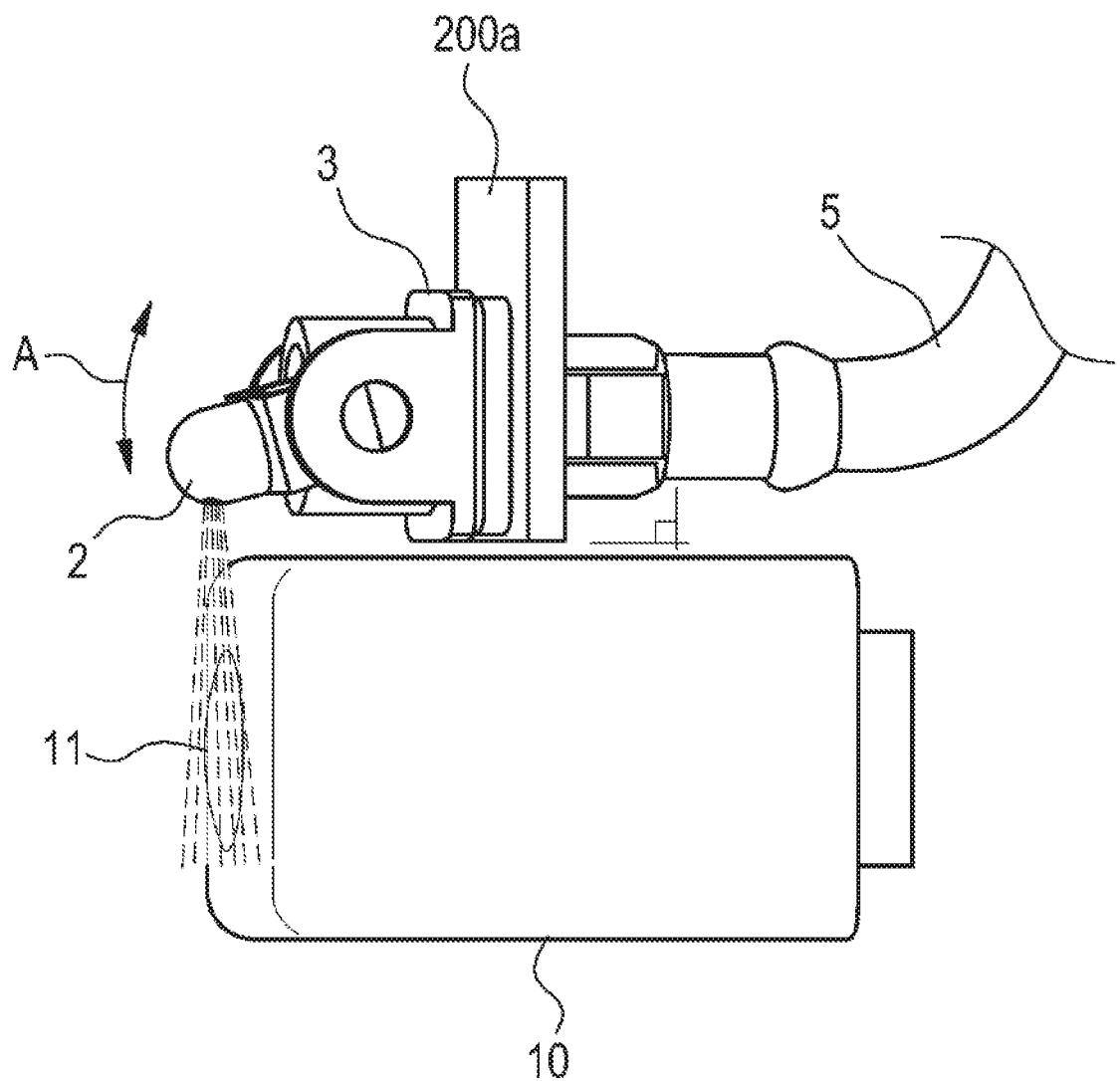
FIGS. 5A and 5B show nozzles attached to vehicle panels in different vehicle types.
Figure 5B:
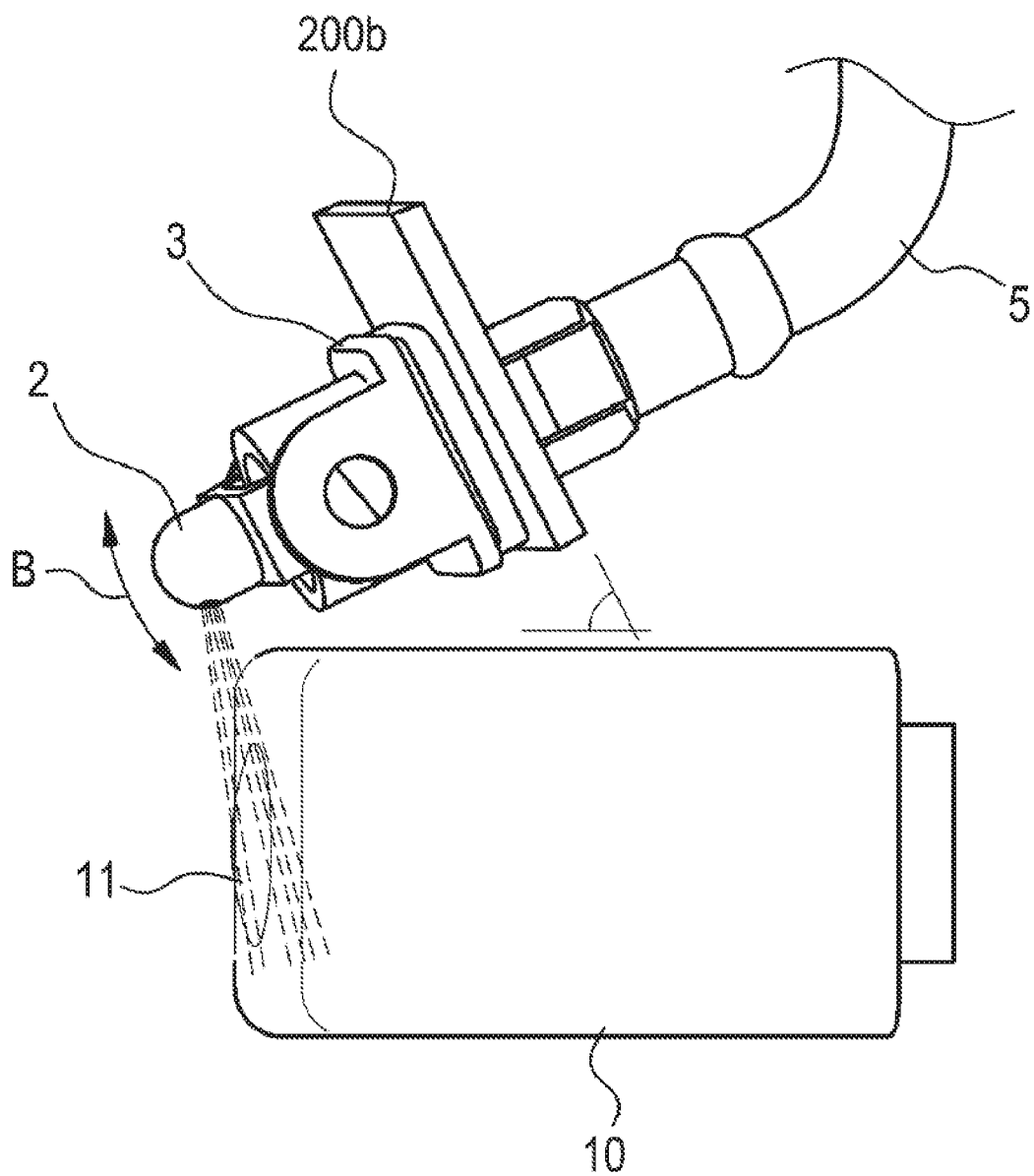

FIGS. 5A and 5B are views showing the nozzle 2 and the nozzle holder 3 attached to the vehicle panels in different vehicle types. The angles of the vehicle panels 200a. 200b are specific to the vehicle type and may differ depending on the vehicle type as shown in FIGS. 5A and 5B.

FIG. 5A is a view showing a mounted state of the nozzle 2 and the nozzle holder 3 in a vehicle type where the vehicle panel 200a is provided substantially perpendicular to the camera 10. FIG. 5B is a view showing a mounted state of the nozzle 2 and the nozzle holder 3 in a vehicle type where the vehicle panel 200b is inclined with respect to the camera 10.

The nozzle 2 of the vehicle cleaner system 1A can inject the cleaning liquid in an appropriate direction by rotating and adjusting the orientation of the nozzle 2 with respect to the nozzle holder 3 along the upper and lower direction of the camera 10 as indicated by arrows A and B even when it is attached to vehicles where the angles of the vehicle panels 200a, 200b with respect to the camera 10 are different.

As explained above, the vehicle cleaner system 1A according to the present embodiment is configured such that the nozzle 2 can be rotated with respect to the nozzle holder 3 by press-fitting the spherical held portion 21 of the nozzle 2 into the cylindrical holding portion 31 of the nozzle holder 3. Further, the vehicle cleaner system 1A is configured such that the rotation direction of the nozzle 2 with respect to the nozzle holder 3 can be restricted to the direction along the upper and lower direction of the camera 10 by engaging the protrusions 27a, 27b provided on the engagement portions 26a, 26b of the nozzle 2 with the openings 35a, 35b provided on the restricting portions 34a, 34b of the nozzle holder 3. Therefore, according to the configuration of the vehicle cleaner system 1A, the injection direction of the cleaning liquid injected from the nozzle 2 can be appropriately and easily adjusted with a simple configuration. As a result, the vehicle cleaner system 1A according to the disclosure can be also applied to a plurality of types of vehicles having different mounting constraints. Further, even when there is a variation in the assembly of the nozzle 2 to the vehicle panel 200a or the camera 10, the variation can be absorbed by rotating the nozzle 2 to adjust the injection direction of the cleaning liquid to an appropriate direction. Therefore, there is no need to change the shape of the nozzle according to the vehicle type, and it is possible to cope with the variation in assembly. In this manner, the manufacturing cost of the vehicle cleaner system 1A and the operation cost of the assembly can be suppressed.

Further, since the engagement portions 26a. 26b of the nozzle 2 are engaged with the restricting portions 34a, 34b of the nozzle holder 3, it is possible to prevent the nozzle 2 from being detached from the nozzle holder 3 even when the cleaning liquid accumulated in the nozzle holder 3 or the nozzle 2 is frozen an expanded. Further, since the protrusions 27a, 27b provided on the engagement portions 26a. 26b of the nozzle 2 are formed in an inclined shape, the pair of engagement portions 26a. 26b of the nozzle 2 can be easily assembled to the inside of the pair of restricting portions 34a. 34b of the nozzle holder 3. Therefore, the protrusions 27a, 27b of the engagement portions 26a, 26b can be easily engaged with the openings 35a, 35b of the restricting portions 34a, 34b, so that the attachment of the nozzle 2 to the nozzle holder 3 is facilitated.

Second Exemplary Embodiment

Figure 6:
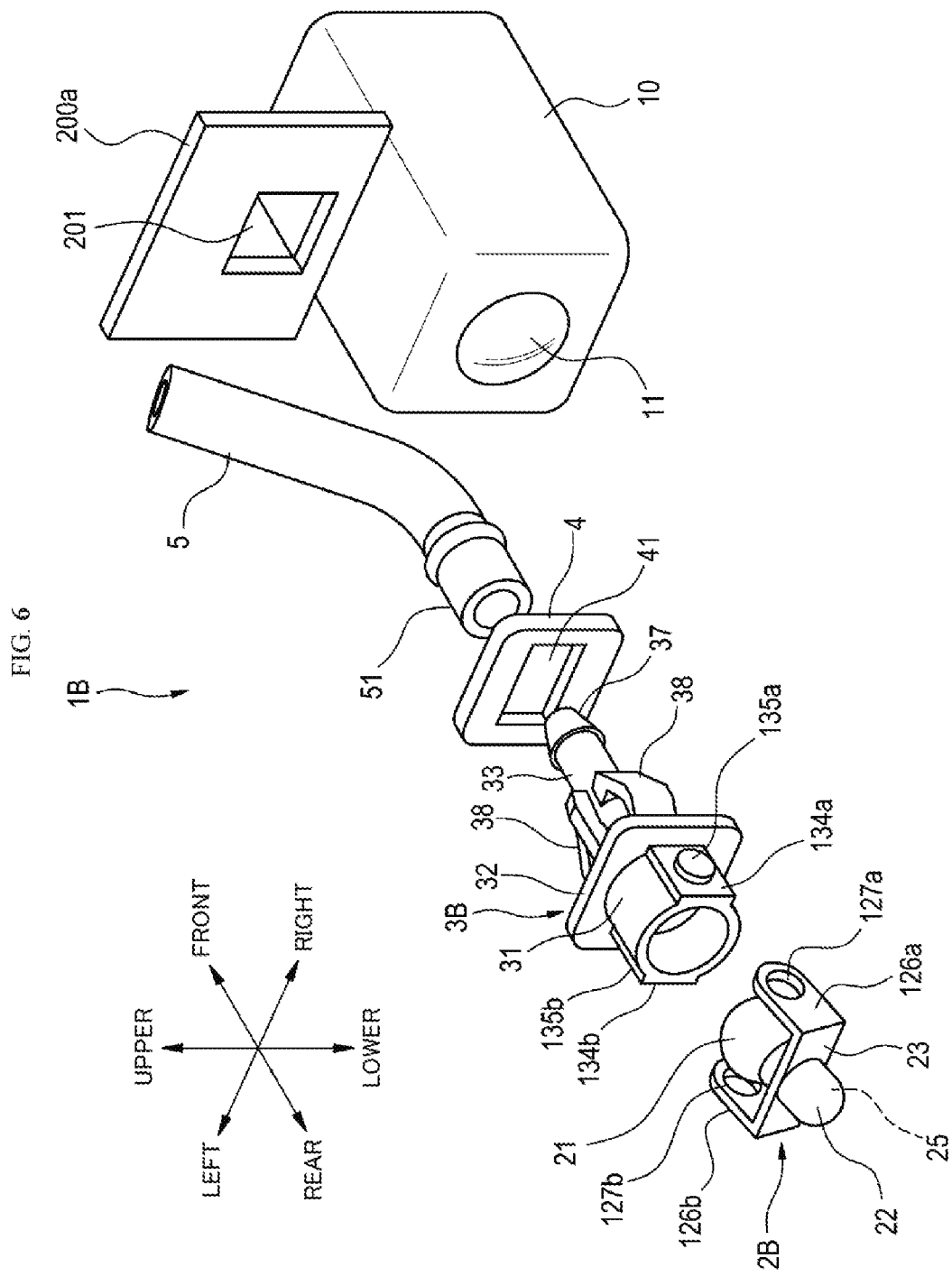
FIG. 6 is an exploded perspective view of a vehicle cleaner system according to a second exemplary embodiment of the disclosure.
Figure 7:
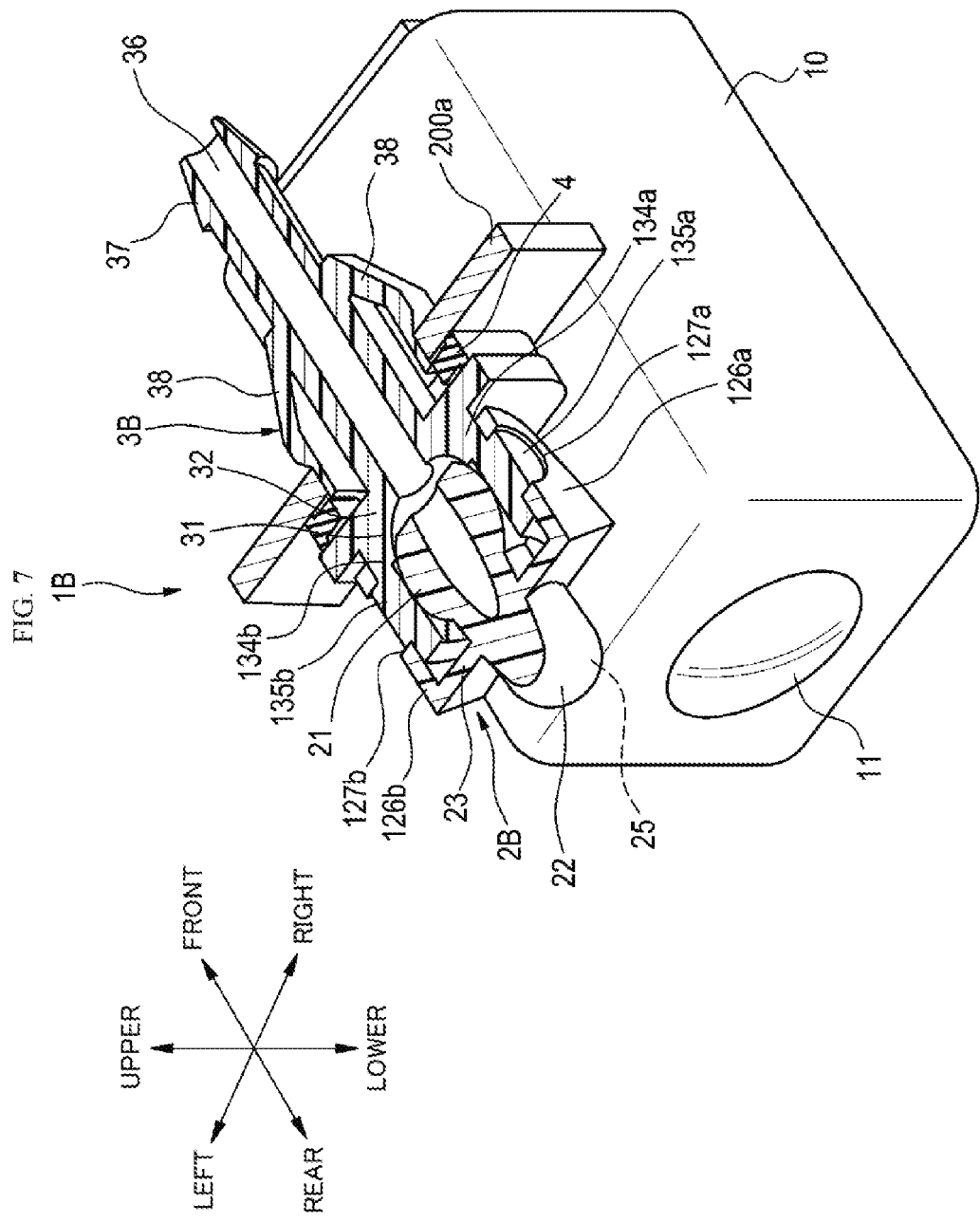
FIG. 7 is a sectional perspective view for explaining the configuration of a nozzle and a nozzle holder.
Figure 8:
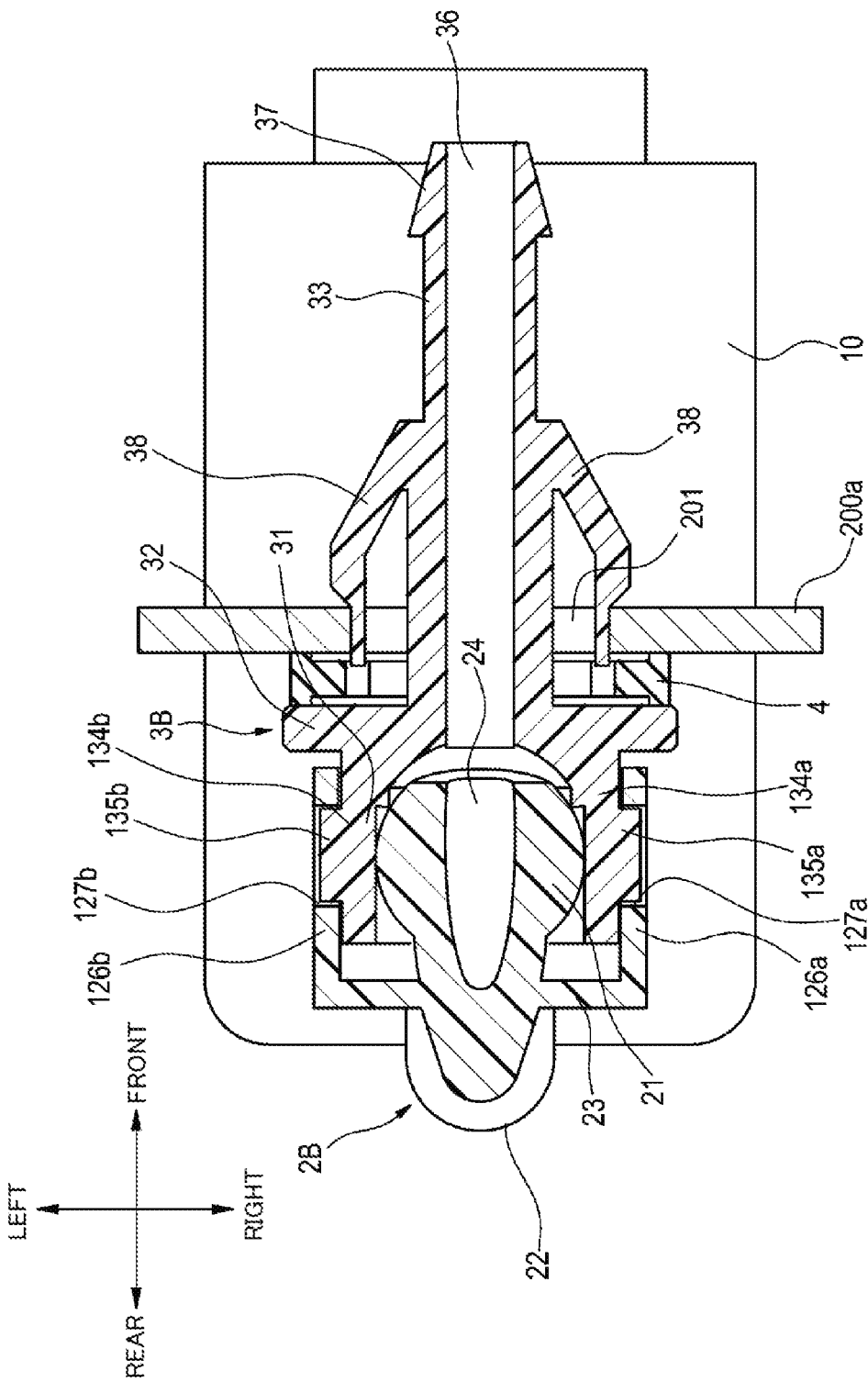
FIG. 8 is a plan view of FIG. 7.

FIG. 6 is an exploded perspective view of a vehicle cleaner system 1B according to a second exemplary embodiment. FIG. 7 is a perspective view showing a state in which a nozzle holder 3B to which a nozzle 2B is assembled is attached to the vehicle panel 200a of the back door 200. FIG. 8 is a plan view of FIG. 7 as viewed from above.

In the vehicle cleaner system 1B according to the second embodiment, the configurations of restricting portions 134a, 134b of the nozzle holder 3B and engagement portions 126a, 126b of the nozzle 2B are different from the configurations of the restricting portions 34a, 34b of the nozzle holder 3 and the engagement portions 26a. 26b of the nozzle 2 in the vehicle cleaner system 1A according to the first embodiment.

As shown in FIGS. 6 to 8, the base 23 of the nozzle 2B has a pair of engagement portions 126a. 126b formed in a flat plate shape and protruding from the base 23 toward the nozzle holder 3B. The pair of engagement portions 126a, 126b are arranged to sandwich the held portion 21 in the left and right direction (third direction) of the held portion 21. Openings 127a, 127b are provided on the pair of engagement portions 126a, 126b, respectively. The openings 127a, 127b in the present embodiment are formed in a circular shape. Meanwhile, the openings 127a, 127b provided on the engagement portions 126a, 126b may be formed as circular recesses. In this case, the recesses are formed on the inner surface sides of the engagement portions 126a, 126b.

The base 32 of the nozzle holder 3B has a pair of restricting portions 134a, 134b formed in a flat plate shape and protruding from the base 23 toward the nozzle 2B. The pair of restricting portions 134a. 134b restricts the rotational direction of the nozzle 2B with respect to the nozzle holder 3B to a predetermined direction. The pair of restricting portions 134a, 134b are arranged to sandwich the holding portion 31 in the left and right direction (third direction) of the holding portion 31. The restricting portions 134a. 134b in the present embodiment are formed integrally with the holding portion 31. The distance between the outer surfaces of the pair of restricting portions 134a, 134b is configured to be substantially the same as the distance between the inner surfaces of the pair of engagement portions 126a, 126b of the nozzle 2B.

Protrusions 135a, 135b are provided on the pair of restricting portions 134a, 134b, respectively. The protrusion 135a provided on the right restricting portion 134a protrudes in the right direction from the right surface of the restricting portion 134a. The protrusion 135b provided on the left restricting portion 134b protrudes in the left direction from the left surface of the restricting portion 134b. The protrusions 135a, 135b in the present embodiment are formed in a circular shape.

Meanwhile, the restricting portions 134a. 134b of the nozzle holder 3 may be formed separately from the holding portion 31. In that case, the restricting portions 134a. 134b are disposed on both sides of the holding portion 31, for example, at positions slightly separated from the holding portion 31. Further, recesses may be provided on the restricting portions 134a. 134b of the nozzle holder 3B, and protrusions may be provided on the engagement portions 126a, 126b of the nozzle 2B. In that case, the protrusions are formed on the inner surface sides of the engagement portions 126a, 126b and formed in an inclined shape in which a portion on the front side becomes low toward the front.

When the held portion 21 of the nozzle 2B is press-fitted into the holding portion 31 of the nozzle holder 3B, the pair of engagement portions 126a, 126b of the nozzle 2B is incorporated so as to overlap with the outside of the pair of restricting portions 134a, 134b of the nozzle holder 3B. As the engagement portions 126a, 126b are incorporated so as to overlap with the outside of the restricting portions 134a, 134b, the openings 127a, 127b of the engagement portions 126a, 126b are engaged with the protrusions 135a. 135b of the restricting portions 134a, 134b.

When the openings 127a, 127b of the nozzle 2B are engaged with the protrusions 135a, 135b of the nozzle holder 3B, the rotatable direction of the held portion 21 held in the holding portion 31 is restricted to the rotational direction with the left and right direction (third direction) passing through the openings 127a, 127b as a rotational axis.

As the rotational direction of the held portion 21 is restricted to the rotational direction about the rotational axis passing through the openings 127a, 127b, a rotational movement direction (first direction) of the discharge port portion 22 of the nozzle 2B is restricted to the direction along the upper and lower direction of the camera 10.

In this manner, the vehicle cleaner system 1B is configured such that the rotational direction of the nozzle 2B with respect to the nozzle holder 3B is restricted to the direction along the upper and lower direction of the camera 10 by engaging the openings 127a. 127b provided on the engagement portions 126a, 126b of the nozzle 2B with the protrusions 135a, 135b provided on the restricting portions 134a, 134b of the nozzle holder 3B. Therefore, the vehicle cleaner system 1B can also obtain the same effects as the vehicle cleaner system 1A according to the first embodiment.

(Modification)

Figure 9:
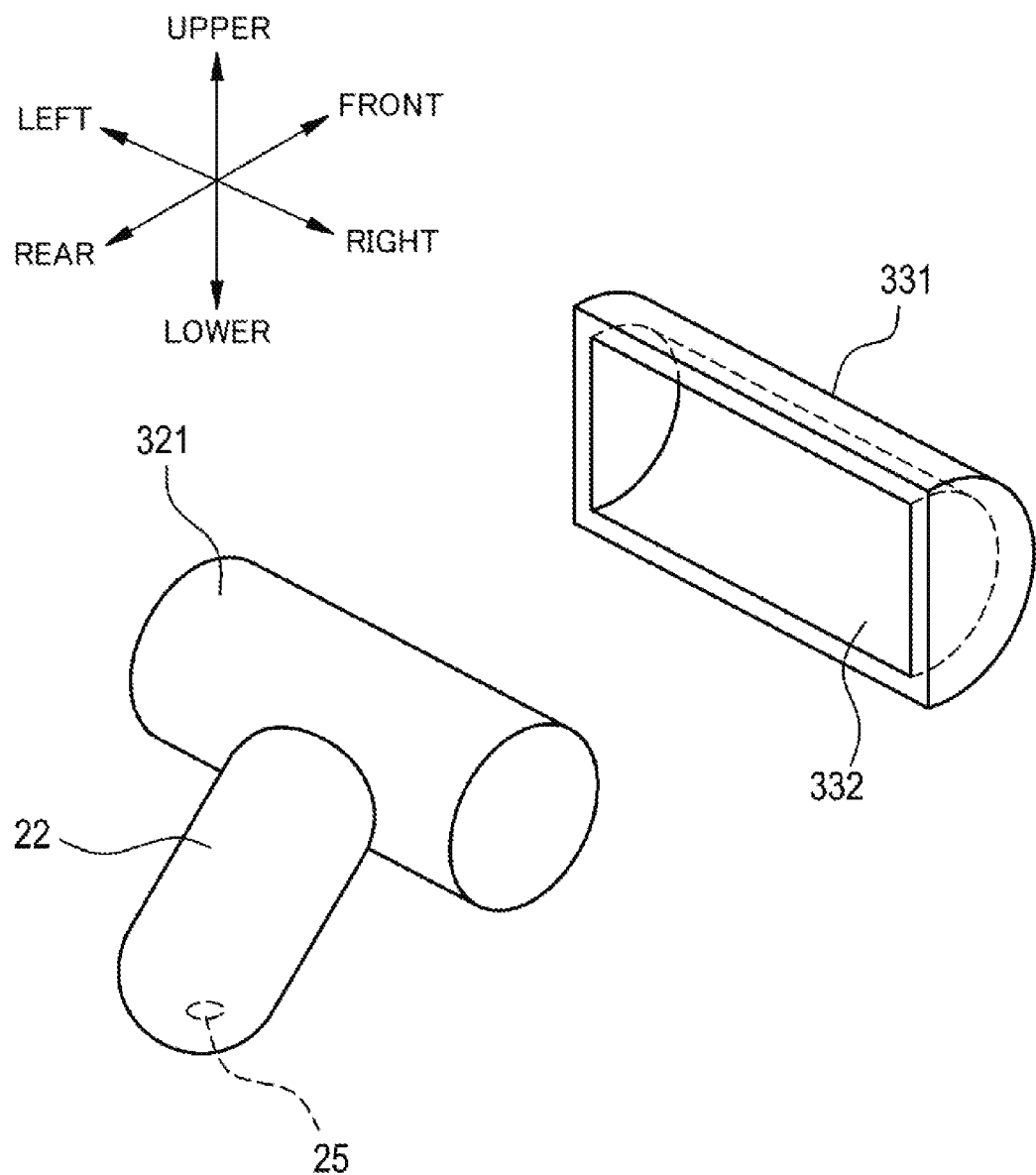
FIG. 9 is a view showing a modification of a holding portion of the nozzle holder and a held portion of the nozzle.

FIG. 9 is a view showing a modification of the held portion 21 of the nozzle 2 and the holding portion 31 of the nozzle holder 3 in the vehicle cleaner systems 1A, 1B of the first and second embodiments. Meanwhile, a communication passage formed in a held portion 321 for passing the cleaning liquid is not shown in FIG. 9.

As shown in FIG. 9, the held portion 321 of a nozzle according to the modification is formed in a cylindrical shape with the rotational axis of the nozzle for rotating in the upper and lower direction (first direction) as the central axis. The rotational axis of the nozzle means the rotational axis in the left and right direction (third direction) passing through the protrusions 27a, 27b in the first embodiment and the rotational axis in the left and right direction (third direction) passing through the openings 127a, 127b in the second embodiment.

Further, a holding portion 331 of a nozzle holder according to the modification is formed in a recessed shape capable of accommodating the cylindrical held portion 321. The holding portion 331 is formed in a shape in which a part of a cylindrical member is cut in a longitudinal direction. The holding portion 331 has a recess 332. The nozzle is assembled to the nozzle holder by press-fitting a part on the front side of the held portion 321 into the recess 332. The inner diameter of the recess 332 of the holding portion 331 is formed to be substantially the same as the diameter of the cylindrical held portion 321.

When the held portion 321 is press-fitted into the holding portion 331, the held portion 321 is rotatably held in the holding portion 331, and the rotatable direction of the held portion 321 is restricted to the rotational direction with the left and right direction passing through the protrusions 27a, 27b or the left and right direction passing through the openings 127a, 127b as a rotational axis. That is, also in this configuration, the rotational direction of the nozzle is restricted to the upper and lower direction, similarly to the first and second embodiments.

According to the held portion 321 and the holding portion 331 of the modification, the rotational direction of the nozzle with respect to the nozzle holder can be restricted with a simple configuration in which the cylindrical held portion 321 is press-fitted into the holding portion 331 having a predetermined shape (e.g., a semi-cylindrical shape).

Meanwhile, the disclosure is not limited to the above-described embodiments, but can be appropriately deformed or improved. In addition, the materials, shapes, dimensions, numerical values, modes, quantities, and locations and the like of the respective components in the above-described embodiments are arbitrary and not limited as long as they can achieve the disclosure.

What is claimed is:

1. A vehicle cleaner system for cleaning an object to be cleaned, the vehicle cleaner system comprising:
 a nozzle configured to eject a cleaning medium to the object to clean the object; and
 a nozzle holder having a holding portion for holding the nozzle and attached to a vehicle or the object,
 wherein
  the nozzle has a held portion held by the holding portion,
  the nozzle is rotatably held with respect to the nozzle holder by press-fitting the held portion into the holding portion in a second direction,
  the nozzle is restricted to rotate in a first direction with respect to the nozzle holder,
  the held portion is formed as a sphere,
  the holding portion is formed in a cylindrical shape capable of accommodating the held portion therein,
  a base is provided at one end of the holding portion along the second direction,
  the base comprises a plate that is perpendicular to the second direction,
  the nozzle holder further includes a pair of restricting portions for restricting the rotation of the nozzle,
  the pair of restricting portions are arranged to sandwich the holding portion in a third direction orthogonal to the second direction and the first direction, and
  a rotational axis of the nozzle is restricted to be in the third direction when the nozzle is engaged with the pair of restricting portions.

2. The vehicle cleaner system according to claim 1, wherein the nozzle is provided above the object, and the first direction is set along an upper and lower direction of the object.

3. The vehicle cleaner system according to claim 1, wherein
 the pair of restricting portions is formed in a flat plate shape protruding from the base along the second direction, and
 the nozzle has a pair of engagement portions formed in a flat plate shape and arranged to sandwich the held portion in the third direction.

4. The vehicle cleaner system according to claim 3, wherein a protrusion is formed in each of the pair of engagement portions, and a recess with which the protrusion is engaged is formed in each of the pair of restricting portions.

5. The vehicle cleaner system according to claim 3, wherein a protrusion is formed in each of the pair of restricting portions, and a recess with which the protrusion is engaged is formed in each of the pair of engagement portions.

6. The vehicle cleaner system according to claim 1, wherein the object to be cleaned is a sensor attached to the vehicle.

* * * * *